United States Patent
McKay

(10) Patent No.: US 10,115,975 B2
(45) Date of Patent: Oct. 30, 2018

(54) WATER-ACTIVATED PERMANGANATE ELECTROCHEMICAL CELL

(71) Applicants: Massachusetts Institute of Technology, Cambridge, MA (US); Open Water Power, Inc., Somerville, MA (US)

(72) Inventor: Ian Salmon McKay, Seattle, WA (US)

(73) Assignees: Massachusetts Institute of Technology, Cambridge, MA (US); Open Water Power, Inc., Somerville, MA (US)

( * ) Notice: Subject to any disclaimer, the term of this patent is extended or adjusted under 35 U.S.C. 154(b) by 500 days.

(21) Appl. No.: 14/609,719

(22) Filed: Jan. 30, 2015

(65) Prior Publication Data

US 2015/0221956 A1 Aug. 6, 2015

Related U.S. Application Data

(60) Provisional application No. 61/934,131, filed on Jan. 31, 2014.

(51) Int. Cl.
*H01M 6/32* (2006.01)
*H01M 6/34* (2006.01)
(Continued)

(52) U.S. Cl.
CPC .............. *H01M 6/34* (2013.01); *H01M 2/162* (2013.01); *H01M 2/36* (2013.01); *H01M 4/06* (2013.01); *H01M 4/38* (2013.01); *H01M 4/463* (2013.01); *H01M 6/045* (2013.01); *H01M 2300/0002* (2013.01)

(58) Field of Classification Search
CPC .......... H01M 6/34; H01M 6/045; H01M 6/06; H01M 6/463; H01M 6/38; H01M 4/06; H01M 4/463; H01M 4/38; H01M 4/36; H01M 4/362; H01M 4/364; H01M 2/162; H01M 2/36; H01M 8/04089; H01M 8/0612; H01M 8/0662; H01M 8/0668; H01M 8/0687; B01D 53/62; C01B 3/34; C01B 13/0211; C01B 13/0214
See application file for complete search history.

(56) References Cited

U.S. PATENT DOCUMENTS 3,368,958 A 2/1968 Pryor et al.
3,788,899 A 1/1974 Zaromb
(Continued)

OTHER PUBLICATIONS

Egan, D.R., et al., "Developments in Electrode Materials and Electrolytes for Aluminum-Air Batteries," *Journal of Power Sources*, vol. 236, pp. 293-310 (2013).
(Continued)

*Primary Examiner* — Stephen J Yanchuk
(74) *Attorney, Agent, or Firm* — Sunstein Kann Murphy & Timbers LLP

(57) ABSTRACT

A water-activated permanganate electrochemical cell includes at least one anode, a solid cathode configured to be electrically coupled to the anode, an electrolyte between the at least one anode and the cathode, and a housing configured to hold the at least one anode, the cathode, and the electrolyte. The electrolyte includes water and permanganate configured to be reduced within the cell in at least a two-step reduction process.

17 Claims, 6 Drawing Sheets

(51) Int. Cl.
*H01M 6/04* (2006.01)
*H01M 2/16* (2006.01)
*H01M 4/06* (2006.01)
*H01M 4/46* (2006.01)
*H01M 4/38* (2006.01)
*H01M 2/36* (2006.01)

(56) References Cited

U.S. PATENT DOCUMENTS

| | | | |
|---|---|---|---|
| 3,969,144 A | | 7/1976 | Zaromb |
| 3,980,498 A | | 9/1976 | Urbach et al. |
| 4,150,197 A | | 4/1979 | Zaromb |
| 4,254,190 A | | 3/1981 | Zaromb |
| 4,275,125 A | | 6/1981 | Struthers |
| 4,369,234 A | | 1/1983 | Zaromb |
| 5,089,107 A | | 2/1992 | Pacheco |
| 5,462,821 A | | 10/1995 | Onoue et al. |
| 5,549,991 A | * | 8/1996 | Licht .............. H01M 12/04 429/188 |
| 5,567,540 A | | 10/1996 | Stone et al. |
| 8,071,242 B2 | | 12/2011 | Rosenfeld et al. |
| 8,080,233 B2 | | 12/2011 | Woodall et al. |
| 2003/0008210 A1 | * | 1/2003 | Licht .............. H01M 4/364 429/219 |
| 2005/0031522 A1 | * | 2/2005 | Delaney .......... B01D 53/62 423/419.1 |
| 2006/0019132 A1 | | 1/2006 | Limpilin et al. |
| 2007/0054155 A1 | | 3/2007 | Damery et al. |
| 2008/0063597 A1 | | 3/2008 | Woodall et al. |
| 2011/0177398 A1 | | 7/2011 | Affinito et al. |
| 2011/0236765 A1 | | 9/2011 | Matsui et al. |
| 2012/0292200 A1 | | 11/2012 | Balagopal et al. |
| 2013/0276769 A1 | | 10/2013 | McKay et al. |
| 2014/0154595 A1 | | 6/2014 | McKay et al. |
| 2015/0171469 A1 | * | 6/2015 | Kourtakis .......... H01M 2/1653 429/50 |

OTHER PUBLICATIONS

European Patent Office, Supplemental European Search Report—Application No. 13876444.4 dated Jun. 24, 2016, 8 pages.

International Searching Authority, International Search Report—International Application No. PCT/US2013/073044, dated Aug. 15, 2014, together with the Written Opinion of the International Searching Authority, 9 pages.

Jung, H., et al., "Low Fuel Crossover Anion Exchange Pore-Filling Membrane for Solid-State Alkaline Fuel Cells," *Journal of Membrane Science*, vol. 373, pp. 107-111 (2011).

Kobayashi, Y., et al., "Trivalent $Al^{3+}$ Ion Conduction in Aluminum Tungstate Solid," *Chem. Mater.*, vol. 9, pp. 1649-1654 (1997).

Li, Q., et al., "Aluminum as Anode for Energy Storage and Conversion: A Review," *Journal of Power Sources*, vol. 110, pp. 1-10 (2002).

MacDonald, D.D., et al., "Evaluation of Alloy Anodes for Aluminum-Air Batteries: Corrosion Studies*," *Corrosion Science*, vol. 44, No. 9, pp. 652-657, Sep. 1988.

MacDonald, D., et al., "Evaluation of Alloy Anodes for Aluminum-Air Batteries," *Journal of the Electrochemical Society*, vol. 135, No. 10, pp. 2397-2409, Oct. 1988.

Merle, G., et al., "Anion Exchange Membranes for Alkaline Fuel Cells: A Review," *Journal of Membrane Science*, vol. 377, pp. 1-35 (2011).

Paramasivam, M., et al., "Influence of Alloying Additives on the Performance of Commercial Grade Aluminum as Galvanic Anode in Alkaline Zincate Solution of Use in Primary Alkaline Batteries," *Journal of Applied Electrochemistry*, vol. 33, p. 303-309 (2003).

Petrovic, J., et al. "Reaction of Aluminum with Water to Produce Hydrogen," A Study of Issues Related to the Use of Aluminum for on-Board Vehicular Hydrogen Storage, U.S. Department of Energy, 27 pages, 2010.

Shayeb, H.A., El, et al., "Effect of Gallium Ions on the Electrochemical Behaviour of Al, Al—Sn, Al—Zn and Al—Zn—Sn Alloys in Chloride Solutions," *Corrosion Science*, vol. 43, pp. 643-654 (2001).

Shen, P.K., et al., "Development of an Aluminum/Sea Water Battery for Sub-Sea Applications," *Journal of Power Sources*, vol. 47, pp. 119-127 (1994).

Zhang, M., et al., "New Electrolytes for Aluminum Production: Ionic Liquids," *JOM*, pp. 54-57, Nov. 2003.

Ziebarth, J.T., "Use of the Al—Ga—In—Sn System for Energy Storage and Conversion," Ph.D. Dissertation, Purdue University, 106 pages, May 2010.

* cited by examiner

Cell configuration for constructing a primary electrochemical couple from the multistep $MnO_4$ reduction when the reactive metal anode is not necessarily compatible with the aqueous $MnO_4$

WATER-ACTIVATED PERMANGANATE ELECTROCHEMICAL CELL

CROSS-REFERENCE TO RELATED APPLICATIONS

This patent application claims the benefit of U.S. Provisional Patent Application No. 61/934,131 filed Jan. 31, 2014, the disclosure of which is incorporated by reference herein in its entirety.

STATEMENT REGARDING FEDERALLY SPONSORED RESEARCH OR DEVELOPMENT

This invention was made with government support under Contract No. FA8721-05-C-0002 awarded by the U.S. Air Force. The U.S. government has certain rights in the invention.

TECHNICAL FIELD

The present invention relates to electrochemical cells for use in dynamic storage of energy, and more particularly, to water-activated permanganate electrochemical cells.

BACKGROUND ART

Aluminum metal is an energy-dense (e.g., greater than 80 MJ/L) fuel with the potential to enhance a variety of common systems. Because aluminum can oxidize in water, it is especially promising as a power source for undersea devices, which are severely limited by the low energy density of conventional anaerobic energy storage media (e.g., less than 1 MJ/L for Li-ion batteries). However, while recent advancements in the scalable de-passivation of aluminum have eliminated some barriers to effective energy storage in aluminum, efficient energy conversion from the heat of reaction $2Al+6H_2O \rightarrow 3H_2+2Al(OH)_3+Q$ remains elusive. This difficulty is mainly attributable to the slow kinetics of the reaction, which are not conducive to maintenance of the steep temperature gradient required for efficient thermal energy conversion. In addition, the continuous loss of some of the aluminum anode due to parasitic corrosion reduces the energy density of the cell and shortens the self-discharge time of the system.

SUMMARY OF EMBODIMENTS

In accordance with one embodiment of the invention, a water-activated permanganate electrochemical cell includes at least one anode, a solid cathode configured to be electrically coupled to the anode, an electrolyte between the anode and the cathode, and a housing configured to hold the anode, the cathode, and the electrolyte. The electrolyte includes water and permanganate configured to be reduced within the cell in at least a two-step reduction process.

In related embodiments, the electrochemical cell may further include an electrolyte injection port, in the housing, configured to introduce the water and/or permanganate into the housing. The electrolyte injection port may be configured to introduce the water or the permanganate into the housing so that the water flows through the cathode. The electrolyte injection port may be configured to introduce the water and dissolved permanganate into the housing so that the water and the permanganate flow through the cathode. The electrochemical cell may further include one or more physical separators between the one or more anodes and the cathode. The one or more physical separators may be formed from a polymer mesh material having openings of about 100 µm or larger. The anode may be in a solid phase or liquid phase. When in the solid phase, the anode may be a solid plate of material. The cell may include a plurality of anode plates disposed within the cathode. The plurality of anode plates may be arranged in a vertical direction so that one end of each anode is surrounded by the cathode. The anode may be an aluminum or aluminum alloy material. When the anode is in the liquid phase, the housing may include an aluminum port configured to introduce the aluminum or aluminum alloy material in a solid phase into the housing. The electrolyte may be a gel and the cathode may be coated with the gel. The cathode may include nickel, a nickel alloy, platinum, and/or glassy carbon. The cathode may be a nickel-plated graphite material. The cathode may have a surface area 100 times or greater than the surface area of the anode. The electrolyte may include seawater. The permanganate may produce a reaction product in step one of the reduction process, and the cathode may be configured to hold the reaction product in contact with the cathode in order to facilitate step two in the reduction process.

BRIEF DESCRIPTION OF THE DRAWINGS

The foregoing features of the invention will be more readily understood by reference to the following detailed description, taken with reference to the accompanying drawings, in which.

DETAILED DESCRIPTION OF ILLUSTRATIVE EMBODIMENTS

Embodiments of the present invention provide a water-activated permanganate electrochemical cell that is composed of a reactive anode material, a high surface area catalyst-coated cathode, and an alkaline electrolyte containing the $MnO_4^-$ anion that is reduced at the cathode in a multi-step reduction process. Much like the $Al-H_2O$ system described in U.S. Ser. No. 14/096,810, incorporated by reference herein in its entirety, an $Al-MnO_4/MnO_2$ system consumes water, e.g., seawater, upon discharge. However, the addition of the oxidizing Mn salt to the electrolyte solution keeps the oxidized Al species in solution, meaning that no waste removal or electrolyte circulation subsystem is required for the permanganate electrochemical cell to operate. These mechanical factors, combined with the high cell voltage and remarkable burst current capacity, make the water-activated permanganate electrochemical cell system as described herein attractive for rapid development, deployment, and integration in high-impact marine applications, especially where long duration, small size and/or high burst power output are critical and where a 'drop-in' upgrade to existing power sources is desired.

In one embodiment, an aluminum alloy material is used for the anode, and aluminum is oxidized to $Al(OH)_3$ at the anode and permanganate is reduced at the cathode in two distinct steps. In the first step, the permanganate is reduced from $MnO_4^-$ to $MnO_2$, providing a theoretical open-circuit potential of 2.9V vs. Al/Al(III) and acurrent density >40 mA/cm$^2$ at 1.5V. $MnO_2$ is then reduced to $Mn_2O_3$ with an open-circuit voltage of 2.45V vs. Al/Al(III) and acurrent density of 7 mA/cm$^2$ at 1.4V. This unique two-step discharge gives the battery a high theoretical energy density of about 7.0 MJ/L (with $H_2O$ feed) or 5.7 MJ/L (without $H_2O$ feed), a high output voltage (~2.3V), and burst current capability >1 A/cm$^3$, comparable to the highest energy density Li-based primary batteries (3.6 MJ/L, ~1 W/L), but with significantly higher power density, lower material cost and dramatically improved safety characteristics. Self discharge via aluminum corrosion may be further minimized to <1 mA/cm$^2$ by the addition of a polar aprotic solvent (such as acetonitrile) to reduce the $H_2O$ activity at the anode surface. Details of illustrative embodiments are discussed below.

Figure 1:
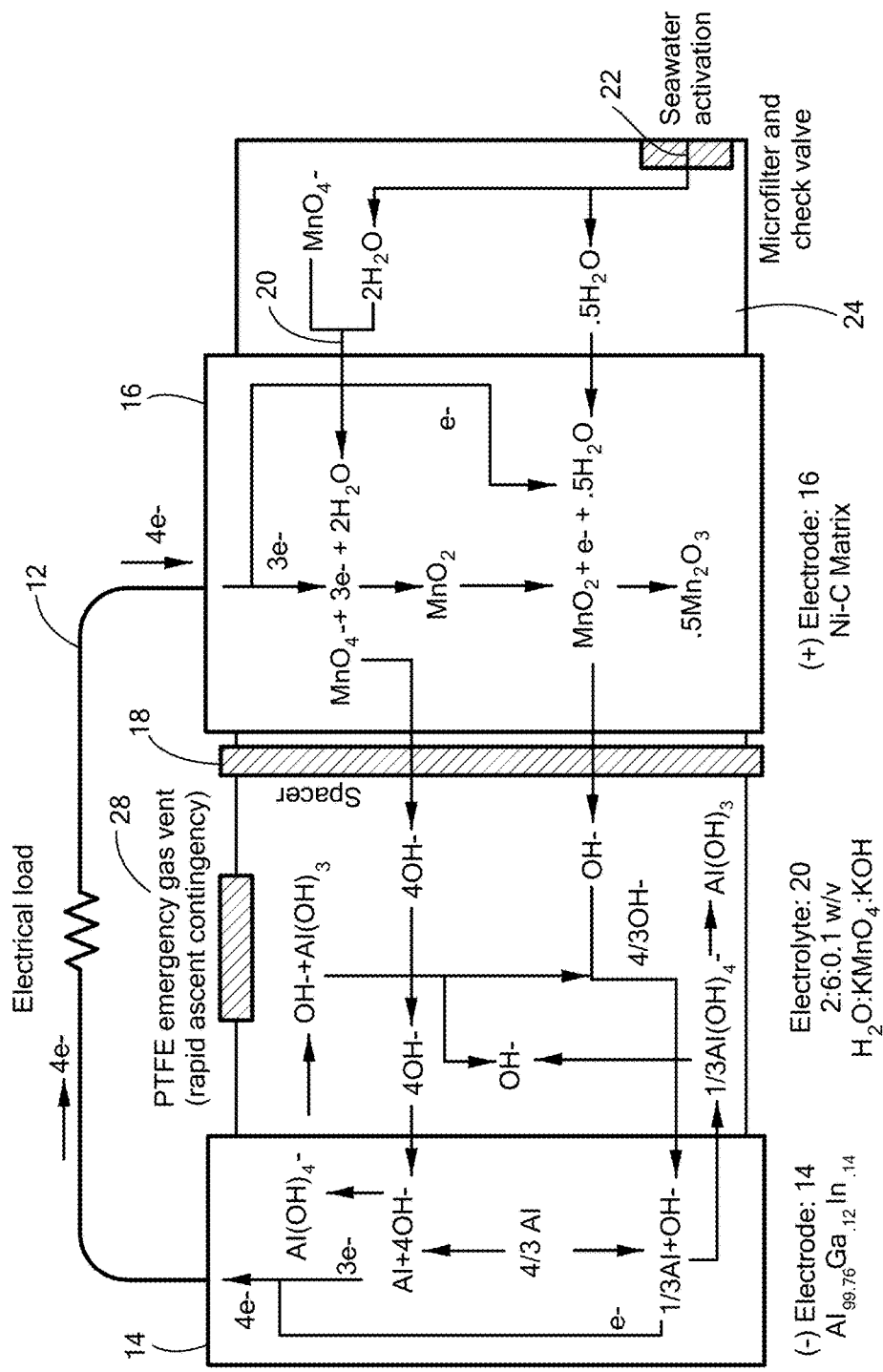
FIG. 1 schematically shows an aluminum-permanganate electrochemical cell and reaction network according to embodiments of the present invention.

FIG. 1 shows a water-activated permanganate electrochemical cell 10 according to embodiments of the present invention. In one preferred embodiment, the electrochemical cell 10 may be constructed using an Al/Ga/In anode material, a dense Ni-plated graphite felt cathode material, and a gel electrolyte consisting of 1% NaOH, 53% $NaMnO_4$, and 46% $H_2O$ by volume for an energy density of 3.3 MJ/L. The electrochemical cell may be configured to utilize primarily the first reduction from permanganate to manganese dioxide. An electrochemical cell based on this configuration may employ the same electrode geometry, but in combination with an electrolyte composed of 2% NaOH, 56% $NaMnO_4$, 36% $H_2O$, and 6% acetonitrile by volume for an integrated system with a projected energy density of 3.0 MJ/L and a power density of 12 W/L. Referring to FIG. 1, the electrochemical cell 10 includes one or more anodes 14 electrically connected to one or more cathodes 16 by leads 12 through which electrons may pass to an external source or sink (not shown). Each anode 14 and cathode 16 may be separated by one or more physical separators 18. Although FIG. 1 shows an aluminum-permanganate electrochemical cell with a $KMnO_4$ electrolyte and a Ni—C coated matrix cathode, other materials may be used for the anode and cathode, and the permanganate ion may be introduced using other salts than $KMnO_4$, as will be discussed in more detail below. As used herein, the term electrochemical cell may encompass an individual electrochemical cell or cell unit, such as shown in FIG. 1, as well as configurations having an array of electrochemical cells, an array of anodes and/or an array of cathodes.

The electrochemical cell 10 also includes an alkaline permanganate electrolyte 20, e.g., aqueous media or non-aqueous, water miscible media, disposed between the anode(s) 14 and cathode(s) 16, and a housing 24 configured to hold the anode(s) 14, the cathode(s) 16, the physical separators 18, and the electrolyte 20. The housing 24 may be made from any electrically insulating, non-reactive material, such as a plastic material (e.g., HDPE or LDPE), that is corrosion-resistant to the electrolyte 20 and the two electrode 14 and 16 materials. The housing 24 may include one or more electrolyte injection ports 22 configured to introduce water and/or permanganate (e.g., dissolved permanganate) into the housing 24. Preferably, the water and/or permanganate is injected into the housing 24 close to the cathode 16 and away from the anode 14. This configuration increases the concentration of water/permanganate near the cathode 16, increasing the reaction rate of the permanganate at the cathode 16, and decreases the concentration of water at the anode 14, minimizing the parasitic corrosion reaction. Alternatively, the electrochemical cell 10 may be self-contained with sufficient water and/or permanganate already included within the electrolyte 20 or contained within the housing 24 and injected into the cell 10 over time. In either embodiment, flow within the cell 10 may be important in order to keep the electrolyte 20 circulating within the cell 20, so that the $MnO_2$ particles remain suspended in the electrolyte 20. In embodiments of the present invention, the electrochemical cell 10 is configured to undergo a multi-step reaction at the cathode 16, e.g., as shown below for an aluminum-permanganate cell:

Step 1: Al-Permanganate Reaction:
Anode (Al): Aluminum Oxidation: $Al+4OH^- \rightarrow Al(OH)_4^- + 3e^-$ (−2.3 vs. SHE)
Cathode (Ni—C): Permanganate Reduction: $MnO_4^- + 3e^- + 2H_2O \rightarrow 4OH^- + MnO_2$ (+0.6 vs. SHE)

Step 2: Al-Manganese Dioxide Reaction:
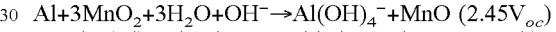
Anode (Al): Aluminum Oxidation: $Al+4OH^- \rightarrow Al(OH)_4^- + 3e^-$ (−2.3 vs. SHE)
Cathode (Ni—C): Manganese Dioxide Reduction: $3MnO_2 + 3H_2O + 3e^- \rightarrow 3OH^- + 3Mn_2O_3$ (+0.15 vs. SHE)

SHE=the Saturated Calomel Electrode

Embodiments of the electrochemical cell 10 provide a theoretical energy density of about 5.7 MJ/L, or about 7.5 MJ/L with access to a constant external water source. With the experimentally-observed coulombic efficiency of 85% and actual loaded output voltages for steps 1 and 2 of 1.5V and 1.3V respectively, this value may be reduced to an energy density of about 3.2 MJ/L. For a more consistent power output and supply voltage, the electrochemical cell 10 can be formulated to utilize only the first reduction step, e.g., with a molar reactant ratio of 1:1:2 NaMnO4:Al:H2O. This embodiment provides a theoretical energy density of about 5.6 MJ/L. With the experimentally-observed coulombic efficiency of 85% and actual loaded output voltages for step 1 of 1.5V, this value may be reduced to an energy density of about 3.1 MJ/L. Therefore, the first reduction step may be preferable for some battery operations, with similar energy density but higher power and output voltage than in the 2-step reduction process. However, in operation, the battery uses both reduction mechanisms, as the excess water required in the electrolyte to support the step 2 reduction is also required to maintain electrolyte conductivity for the duration of the step 1 reduction.

Figure 2:
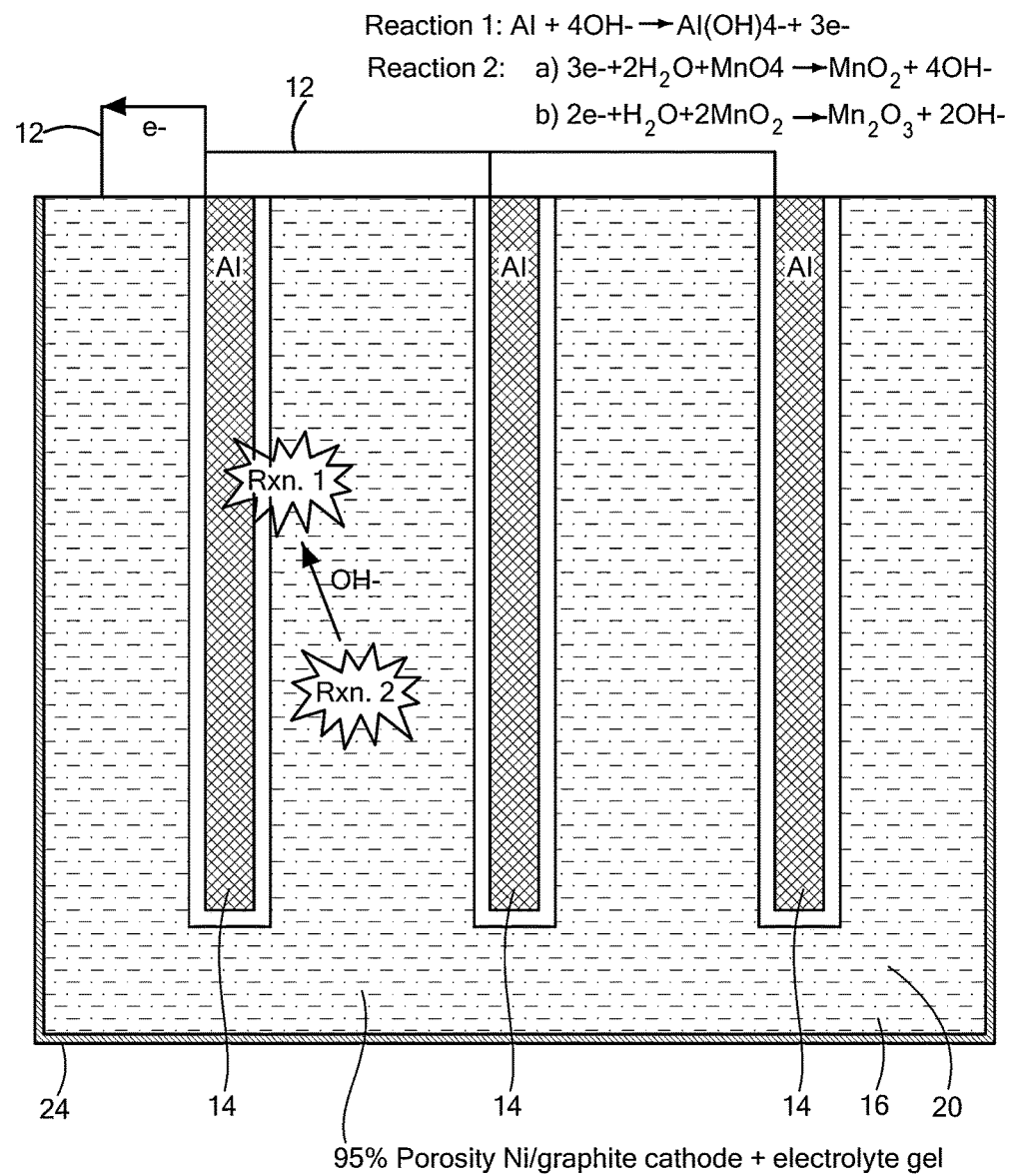
FIG. 2 schematically shows an aluminum-permanganate electrochemical cell configuration with multiple anodes according to embodiments of the present invention.

As shown in FIG. 2, one embodiment of the electrochemical cell 10 includes a plurality of anode 14 plates positioned within the cathode 16. For example, a solid aluminum or aluminum alloy anode 14 may be placed within a high surface-area cathode material 16, such as Pt-loaded carbon paper, felt, cloth, or mesh (as will be described in more detail below). The electrolyte 20 may be in a gel and disposed or contained within the cathode 16. The anodes 14 may be physically separated from the cathode 16 and the electrolyte 20 by the surface properties of the materials. In this case, additional physical separators 18 do not need to be included, although they may be used. The one or more anode 14 plates may be arranged in a vertical direction so that one end of each anode 14 is surrounded by the cathode 16. The aluminum alloy may include In, Mg, Sn, and/or Ga. For example, the aluminum alloy may be aluminum with about 0.1 wt % of In and 0.1 wt % of Ga. The electrical leads 12 to the anodes 14 may be made with any electrically conductive material, such as a small diameter wire or razor blade.

Referring again to FIG. 1, the electrolyte injection port(s) 22 may be in fluid communication with a water supply or a permanganate supply (either in dry or liquid form). The electrochemical cell 10 is activated by the addition of water to the system. For example, the water may be added to a powdered electrolyte mix and then the water/electrolyte mix may be injected into the system. The water supply may be an internal tank that stores water or may be an external supply drawn from outside the electrochemical cell 10, such as seawater. The electrochemical cell 10 may consume approximately one-fourth of its own volume in seawater during the discharge process. The housing 24 may also include one or more hydrogen release valves 28 configured to allow any hydrogen generated within the housing 24 to be released from the electrochemical cell 10. Aluminum hydroxide waste forms on the aluminum anode 14 when the aluminum reacts with the hydroxide ions. The aluminum hydroxide waste can reduce the performance of the fuel cell 10. The waste may be removed from the electrolyte 20 using filters and similar technologies or may be allowed to build up in the electrolyte 20. If waste removal is desired, each cell 10 may have a separate waste removal system or many cells 10 may have a shared waste removal system. For example, the waste may be carried over and around the cells before settling to the bottom of the housing 24, where it may be removed or become trapped in a low-conductivity water immiscible fluid, such as mineral oil. The waste or the fluid with the waste may be pumped out to a shared waste filter/ejection system such as described in U.S. Ser. No. 14/096,810, already incorporated by reference herein. If the waste is allowed to build up in the electrolyte 20 or some electrolyte 20 is lost during operation, the electrolyte 26, or some portion thereof, may be replaced periodically.

Figure 3:
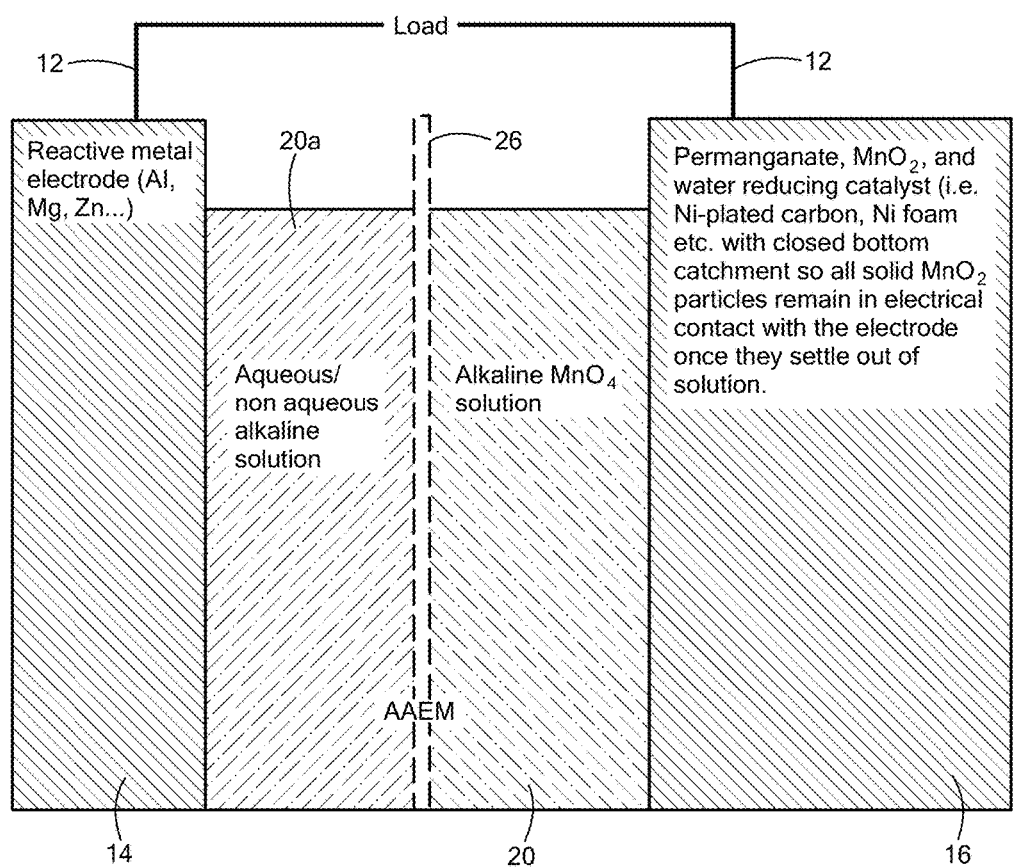
FIG. 3 schematically shows a water-activated permanganate electrochemical cell configuration with a reactive metal anode according to embodiments of the present invention.

As mentioned above, the permanganate ion in the electrolyte 20 may be provided using various salts, e.g., $KMnO_4$, $LiMnO_4$, $NaMnO_4$, etc. In addition, the electrolyte 20 may include an aqueous media and/or non-aqueous, water miscible media 20a. As shown in FIG. 3, one or more additional anion permeable polymer layers 26, such as nafion or anion exchange membranes, may be added to the cell 10 in order to separate a reactive metal anode 14 that may not be compatible with an aqueous alkaline permanganate electrolyte 20. The electrolyte 20 may include a non-aqueous, water miscible material 20a with good OH— ion (anion) conductivity, such as ionic liquids and light alcohols, e.g., methanol. In this embodiment, the water may be gradually injected into the electrolyte 20, preferably near the cathode 16. The non-aqueous, water miscible electrolyte 20a may have about 90 wt % of water or less. In addition, the water or the electrolyte 20 may have one or more of the additives mentioned below, e.g., ions dissolved in it, to promote ion conductivity, adjust power output, and reduce the corrosion rate of the fuel cell. Due to the low water content of the electrolyte 20 near the anode 14, parasitic corrosion of the anode 14 material may be significantly reduced since the concentration of water at the anode 14 is reduced, making the half-cell reactions much more favorable over the parasitic reaction.

The goal of the electrolyte 20 is to allow the transport of hydroxide ions without allowing water to react directly with the reactive material (e.g., Al, Li, Mg, Na or alloys thereof) in the anode 14. Thus, further additions may be made to the electrolyte 20 to increase the power output and reduce the corrosion rate of the fuel cell. To reduce corrosion, inert compounds, such as ionic liquids (e.g., 1-ethyl-3-methyl-imidazlium hydroxide and 1-butyl-3-methyl imidazolium tetraflouroborate) may be added to the electrolyte 20 to decrease the water activity of water molecules in the solution. This reduction in mobility helps trap the water molecules near the cathode 16, further reducing the water concentration near the anode 14 which causes parasitic corrosion. Other liquids, such as primary alcohols (e.g., 60% methanol), secondary alcohols (e.g., 2-propanol), acetonitrile (e.g., 30% ACN), dimethyl carbonate, and dimethyl sulfoxide may also be added to the electrolyte in order to promote good OH— ion (anion) conductivity. The anion conductivity can be increased by dissolving a base, such as KOH, into the electrolyte 20. The ionic liquids, surfactant, and other liquids may be added in varying amounts to the electrolyte 20, e.g., from about 5-95 vol % of the total electrolyte.

As mentioned above, the anode 12 may be in a solid phase or a liquid phase and may include a reactive metal or metal alloy, such as aluminum, lithium, magnesium, sodium, or alloys thereof. When in the solid phase, the anode 14 may be in the form of a thin plate, as shown in FIG. 2. The thickness of the anode 14 may vary depending on the power or energy density requirements, e.g., for higher power density, a thinner anode may be used and for higher energy density the mass of the anode may be increased. Preferably, the anode thickness may be about 1-3 mm. Any purity of the anode material may be used, though certain impurities, such as iron and copper, may decrease the energy density of the fuel cell by increasing the rate of parasitic corrosion. The goal of the anode 14 is to avoid passivation with both $Al_2O_3$ and $Al(OH)_3$ as well as hinder the $H_2$ evolution reaction. Alloying the aluminum with a metal with a high hydrogen overpotential and a higher nobility than aluminum in the electrochemical series (e.g., indium) reduces the corrosion of the aluminum metal and may increase the discharge potential. Alloying the aluminum with a metal that disrupts the alumina passivation layer which covers the anode 14 (e.g., gallium) increases the current density. Combinations of metals can be alloyed with aluminum to achieve a mixture of effects, e.g., Al or Al alloy with Ga, In, Sn, and/or Mg. Preferably, the anode 14 is made of an aluminum alloy with about 0.1 wt % of In and 0.1 wt % of Ga. In embodiments using a solid anode, the electrochemical cell 10 is mechanically recharged by replacing the solid alloy anodes 14 as well as replacing the Li/Na/K $MnO_4$ electrolyte.

When in the liquid phase, the anode 14 material may be comprised of a liquid metal alloy that includes aluminum. The liquid metal (e.g., an alloy comprised of Ga, In, Sn, and/or Mg) is not consumed in the anode-side reaction. Rather, the liquid metal merely facilitates the passage of aluminum fuel to the anode-electrolyte interface. For example, the liquid material may be about 100 wt % gallium or may be about 65-70% wt % Ga, 20-25% wt % In, and 5-15 wt % Sn. The solid aluminum or aluminum alloy material may be fed into the liquid material via an in-situ interdiffusion process, such as described in U.S. Patent Application Publication No. 2013/0276769, incorporated by reference herein in its entirety. Advantages of this embodiment over solid-anode technology are that it provides a higher standard cell potential vs. both oxygen reduction and hydrogen evolution electrodes and a significantly slower rate of anodic corrosion relative to the rate of galvanic discharge.

Figure 4A:
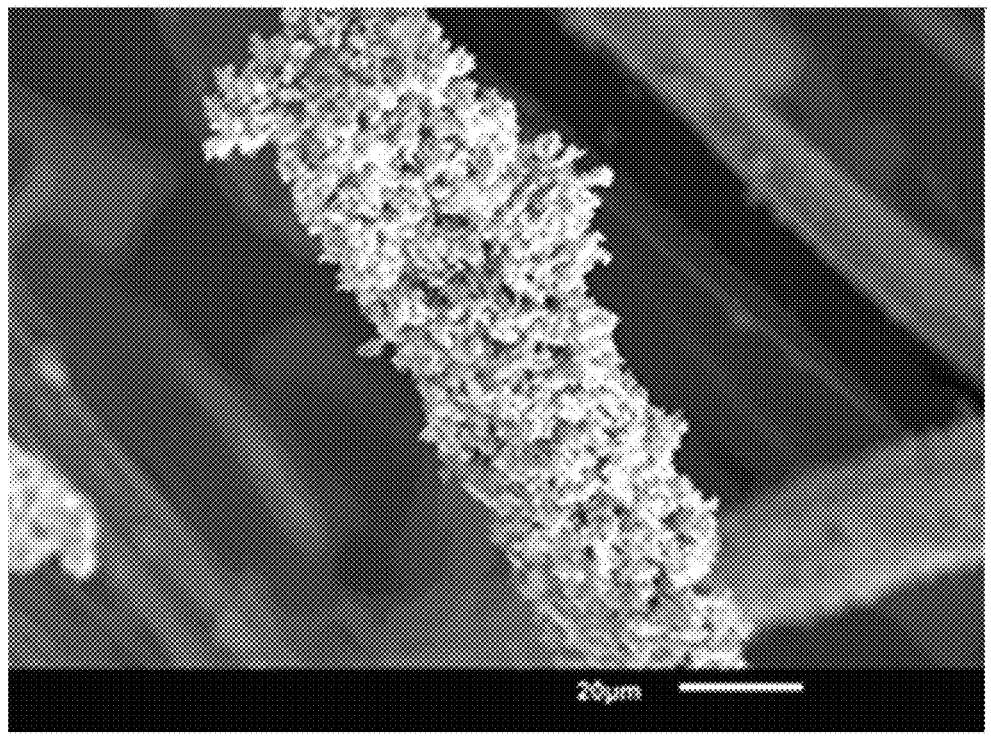
FIG. 4A is a scanning electron micrograph showing a high-porosity region of the cathode.
Figure 4B:
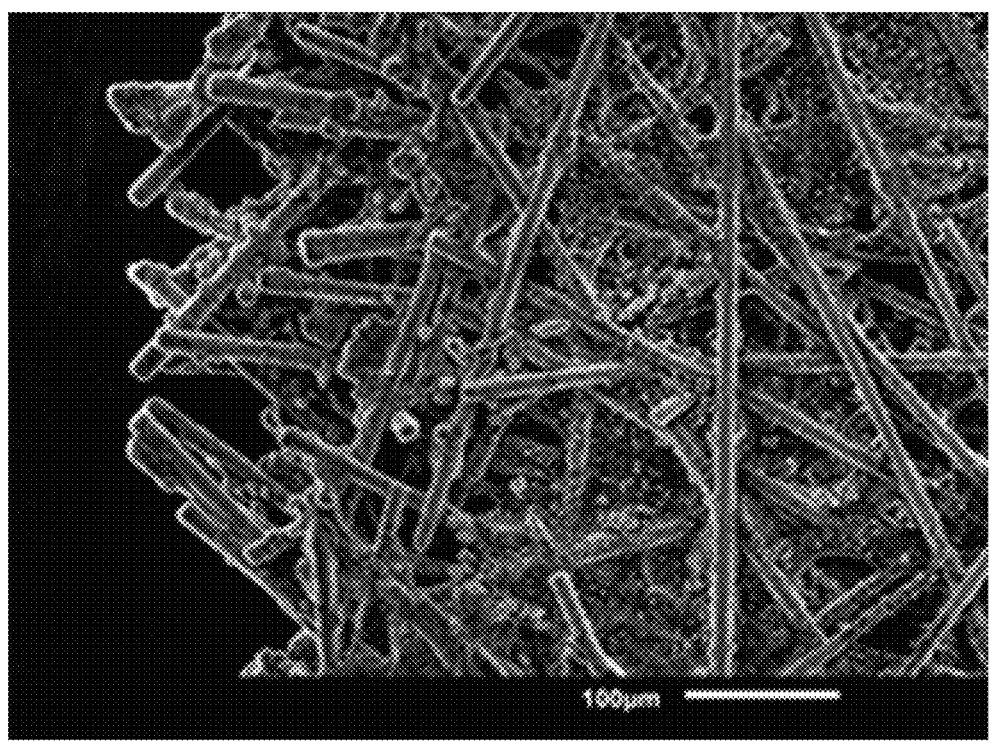
FIG. 4B is a scanning electron micrograph showing a low porosity region towards the bottom part of the cathode according to embodiments of the present invention.

Whether using a solid or liquid anode 14, the cathode 16 may be made of any material which is chemically stable in the chosen electrolyte 20. For example, nickel and platinum may be used. In addition, the cathode 16 preferably has a high surface area (>3 m$^2$/mL) coated with a catalyst in order to decrease the current density on its surface. For example, the cathode 16 to anode 14 surface area ratio may be 100:1 or greater. This may be achieved by selecting materials with highly engineered surfaces, such as carbon paper, felt, cloth, mesh, or foam materials, and then depositing Ni or Pt on its surface, e.g., by pulsed-current electrodeposition. For example, the cathode 16 may be Pt-coated carbon or titanium or a NiC matrix material. The electrolyte 20 may then be coated or contained within the open areas of the cathode 16. The cathode 16 may be in the form of a thin plate that is spaced apart from the anode 14. The thickness of the cathode 16 may vary depending on the power or energy density requirements, and one or more cathodes 16 may be used in the electrode stack. Preferably, the cathode thickness may be about 0.5-10 mm. In order to promote the multi-step permanganate reduction process, the cathode 16 is configured to hold the reaction product in contact with the cathode 16 in order to facilitate the second step in the reduction process. One such configuration may include the cathode 16 having a graded-porosity that facilitates continued electrical connection to the MnO$_2$ particles that are shed from the catalyst in the initial reduction. For example, as shown in FIGS. 4A and 4B, the cathode 16 may include a high-porosity region in the upper section of the cathode 16 (as shown in FIG. 4A) and a low-porosity 'catchment' region toward the bottom section of the cathode 16 in order to catch the MnO$_2$ microparticles that form in the electrolyte as the reaction product and ensure their continuous contact with the cathode 16.

The one or more physical separators 18 may be made of any material with a relatively high electrical resistivity which is chemically stable in the chosen electrolyte 20, such as a plastic material (e.g., HDPE or LDPE). For example, the electrical resistivity may be greater than about 10$^8$ ohms·cm. In addition, the physical separator 18 preferably has a high areal density (e.g., mostly open area), so that the water may be introduced and allowed to flow through the physical separator 18. For example, the physical separator 18 may be made with a mesh material having about 95% or greater areal density (e.g., thin strands of a polymer material), preferably having openings of about 100 μm or larger. In addition, the physical separator 18 may be in the form of a thin plate disposed adjacent to the cathode 16. The thickness of the physical separator 18 may vary, but is preferably about 200 μm or less.

EXAMPLES

To further illustrate embodiments of the present invention, the following non-limiting Examples are provided.

Example 1: Al-Permanganate Electrochemical Cell

Figures 5, 6:
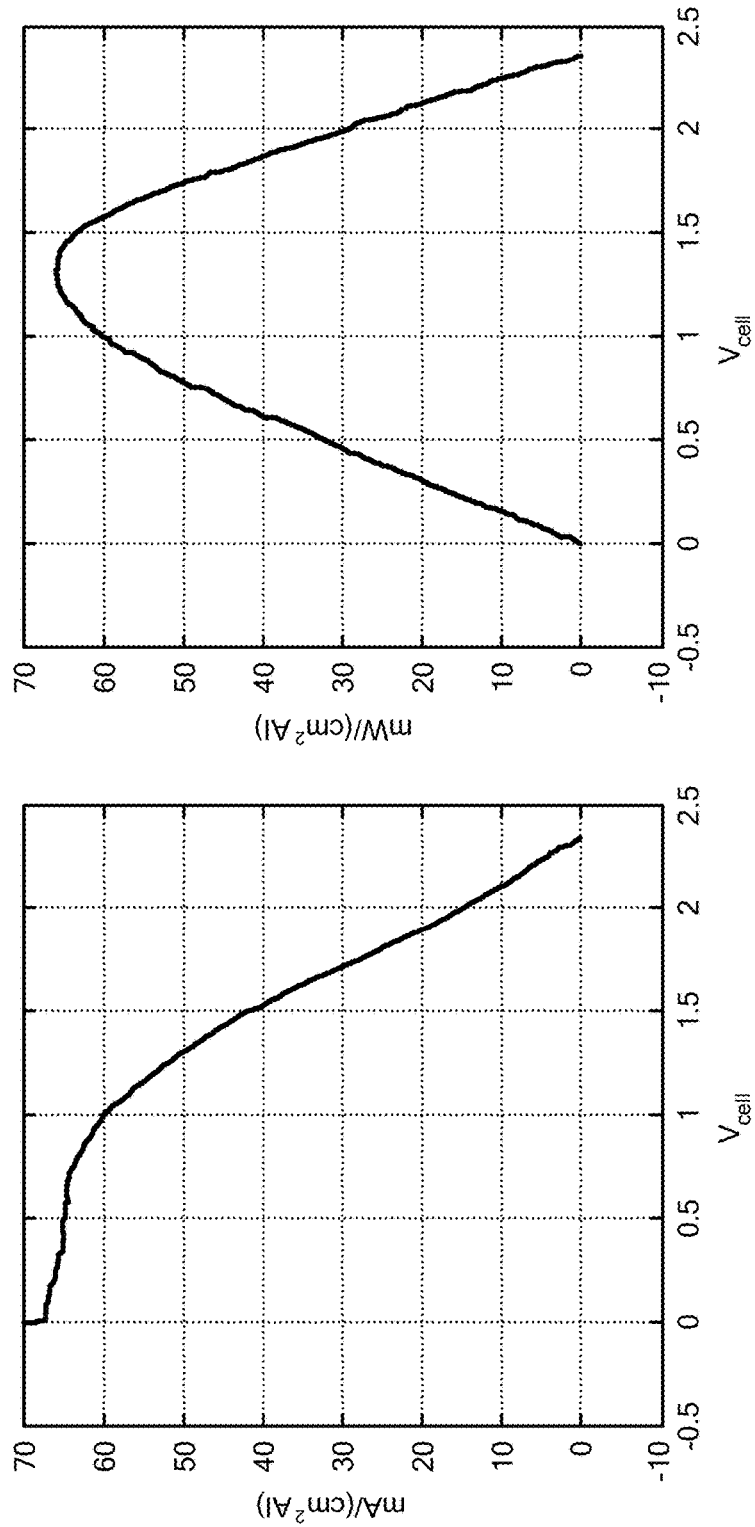
FIGS. 5 and 6 show performance curves for an anode and a cathode, respectively, in a permanganate electrochemical cell formed according to embodiments of the present invention.

An electrochemical cell was created in 2M KOH:0.3M NaMnO$_4$ electrolyte with a solid aluminum anode (0.1 cm$^3$) and a Ni foam cathode (1.0 cm$^3$, 90% porosity). FIGS. 5 and 6 show performance curves for the anode and the cathode, respectively, for the cell. The cell was operated at room temperature.

Example 2: Al-Permanganate Electrochemical Cell

Figure 7:
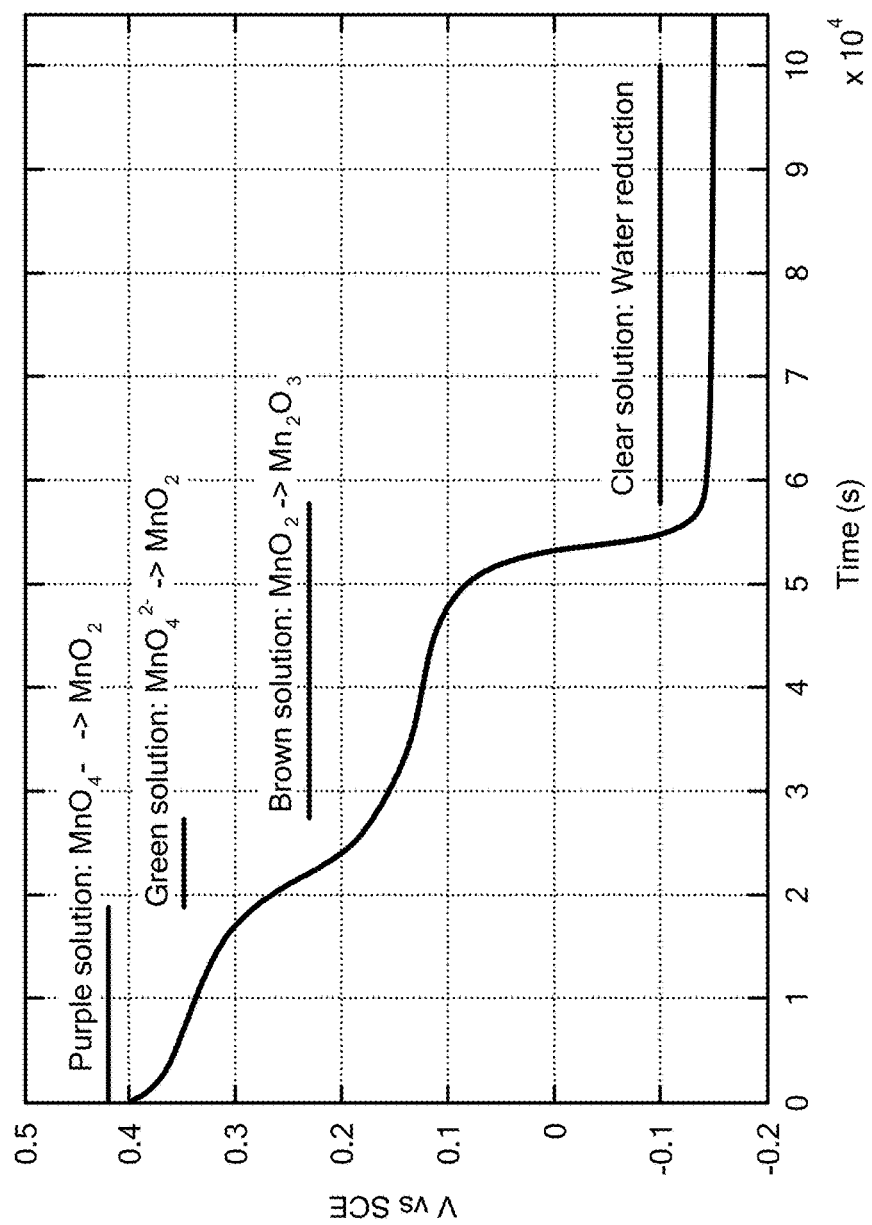
FIG. 7 is a graph showing the voltage versus the Saturated Calomel Electrode over time in a permanganate electrochemical cell having a multi-step reduction according to embodiments of the present invention.

FIG. 7 is a graph showing the voltage versus the Saturated Calomel Electrode over time in a permanganate electrochemical cell having a multi-step reduction. The cell was created in 0.5M KOH 0.3M KMnO$_4$ electrolyte with an aluminum anode and a Ni cathode formed according to embodiments of the present invention.

Although the above discussion discloses various exemplary embodiments of the invention, it should be apparent that those skilled in the art can make various modifications that will achieve some of the advantages of these embodiments without departing from the true scope of the invention.

What is claimed is:
1. A water-activated permanganate electrochemical cell comprising:
   at least one anode;
   a solid cathode configured to be electrically coupled to the at least one anode, the cathode comprising a porous NiC matrix material;
   an electrolyte between the at least one anode and the cathode, the electrolyte including water and a permanganate salt and;
   wherein the electrolyte permanganate is configured to be reduced within the cell in at least a two-step reduction process,
   the electrolyte includes an amount of water sufficient to support both steps of the two-step reduction process,
   the permanganate produces a first reaction product in step one of the reduction process, and
   the cathode includes a high-porosity region in the upper section of the cathode and a low-porosity catchment region toward the bottom section of the cathode that is configured to hold the first reaction product from step one in contact with the cathode in order to facilitate step two in the reduction process;
   a housing configured to hold the at least one anode, the cathode, and the electrolyte, the housing comprises an injection port configured to introduce water into the housing so that the water flows through the cathode.

2. The electrochemical cell according to claim 1, wherein the electrolyte injection port is configured to introduce the water and dissolved permanganate into the housing so that the water and the permanganate flow through the cathode.

3. The electrochemical cell according to claim 1, wherein the electrolyte injection port is configured to introduce the permanganate into the housing so that the permanganate flows through the cathode.

4. The electrochemical cell according to claim 1, further comprising one or more physical separators between the at least one anode and the cathode.

5. The electrochemical cell according to claim 4, wherein the one or more physical separators are formed from a polymer mesh material having openings of about 100 μm or larger.

6. The electrochemical cell according to claim 1, wherein each anode is a solid plate of material.

7. The electrochemical cell according to claim 6, wherein a plurality of anode plates are disposed within the cathode.

8. The electrochemical cell according to claim 7, wherein the plurality of anode plates are arranged in a vertical direction so that one end of each anode is surrounded by the cathode.

9. The electrochemical cell according to claim 1, wherein each anode is an aluminum or aluminum alloy material.

10. The electrochemical cell according to claim 9, wherein each anode is in a liquid phase and the housing includes an aluminum port configured to introduce the aluminum or aluminum alloy material in a solid phase into the housing.

11. The electrochemical cell according to claim 1, wherein the electrolyte is a gel and the cathode is coated with the gel.

12. A water-activated permanganate electrochemical cell comprising:
- at least one anode;
- a solid cathode configured to be electrically coupled to the at least one anode, the cathode comprising a nickel plated graphite material;
- an electrolyte between the at least one anode and the cathode, the electrolyte including water and a permanganate salt and;
- wherein the electrolyte permanganate is configured to be reduced within the cell in at least a two-step reduction process,
- the electrolyte includes an amount of water sufficient to support both steps of the two-step reduction process,
- the permanganate produces a first reaction product in step one of the reduction process, and
- the cathode includes a high-porosity region in the upper section of the cathode and a low-porosity catchment region toward the bottom section of the cathode that is configured to hold the first reaction product from step one in contact with the cathode in order to facilitate step two in the reduction process;
- a housing configured to hold the at least one anode, the cathode, and the electrolyte, the housing comprises an injection port configured to introduce water into the housing so that the water flows through the cathode.

13. The electrochemical cell according to claim 1, wherein the cathode has a surface area that is greater than or equal to 100 times a surface area of the at least one anode.

14. The electrochemical cell according to claim 1, wherein the electrolyte includes an aqueous solution comprising sodium chloride.

15. The electrochemical cell according to claim 1, the first step of the two-step reduction process requiring a first amount of water, the electrolyte including an amount of water greater than the first amount and sufficient to support the second step of the two-step reduction process.

16. The electrochemical cell according to claim 1, wherein the electrolyte includes at least one inert compound to decrease the activity of water molecules in the solution to help trap the water molecules near the cathode.

17. The electrochemical cell according to claim 1, wherein the electrolyte includes at least one anion conductivity promoter.

* * * * *